United States Patent
Marzola et al.

[11] Patent Number: 5,698,617
[45] Date of Patent: Dec. 16, 1997

[54] CONCENTRATES SUITABLE FOR THE PREPARATION OF FUNCTIONALIZED POLYOLEFINS AND FUNCTIONALIZATION PROCESS USING SAID CONCENTRATES

[75] Inventors: Roberto Marzola; Gian Luigi Rigosi, both of Ferrara, Italy

[73] Assignee: Montell North America Inc., Wilmington, Del.

[21] Appl. No.: 68,012

[22] Filed: May 27, 1993

[30] Foreign Application Priority Data

May 29, 1992 [IT] Italy ................ MI92A1335

[51] Int. Cl.⁶ .......................... C08F 255/02
[52] U.S. Cl. .......... 523/202; 523/201; 523/214; 524/425; 524/449; 524/451; 524/494; 525/285; 525/301
[58] Field of Search ............. 523/202, 214, 523/201; 524/425, 449, 451, 494; 525/285, 301

[56] References Cited

U.S. PATENT DOCUMENTS

| | | | |
|---|---|---|---|
| 3,375,300 | 3/1968 | Ropp | 525/117 |
| 3,868,433 | 2/1975 | Bartz et al. | 525/78 |
| 3,987,122 | 10/1976 | Bartz et al. | 525/193 |
| 4,451,589 | 5/1984 | Morman et al. | 523/124 |
| 4,794,066 | 12/1988 | Taggi et al. | 430/137 |
| 4,997,720 | 3/1991 | Bourbonais et al. | 428/500 |
| 4,997,872 | 3/1991 | Ohmae et al. | 524/433 |
| 5,140,074 | 8/1992 | DeNicola, Jr. et al. | 525/263 |
| 5,236,962 | 8/1993 | Govoni et al. | 521/56 |
| 5,238,635 | 8/1993 | Launchbury et al. | 264/211 |
| 5,286,791 | 2/1994 | DeNicola, Jr. et al. | 525/71 |
| 5,290,856 | 3/1994 | Okamoto et al. | 525/64 |
| 5,310,794 | 5/1994 | DeNicola, Jr. et al. | 525/71 |
| 5,324,755 | 6/1994 | Kilius et al. | 523/214 |
| 5,349,016 | 9/1994 | DeNicola, Jr. et al. | 525/71 |
| 5,370,813 | 12/1994 | DeNicola, Jr. et al. | 525/68 |
| 5,397,836 | 3/1995 | DeNicola, Jr. et al. | 525/71 |
| 5,411,994 | 5/1995 | Galli et al. | 521/50.5 |
| 5,414,027 | 5/1995 | DeNicola, Jr. et al. | 522/112 |
| 5,447,985 | 9/1995 | DeNicola, Jr. et al. | 524/534 |

FOREIGN PATENT DOCUMENTS

| | | |
|---|---|---|
| 0171777 | 2/1986 | European Pat. Off. . |
| 0254348 | 1/1988 | European Pat. Off. . |
| 0290149 | 11/1988 | European Pat. Off. . |
| 395083 | 10/1990 | European Pat. Off. . |
| 0439079 | 7/1991 | European Pat. Off. . |
| 0501762 | 9/1992 | European Pat. Off. . |
| 0519341 A1 | 12/1992 | European Pat. Off. . |

OTHER PUBLICATIONS

"Encyclopedia of Polymer Science and Engineering", vol. 9, Maleic and Fumaric Polymers, pp. 231–234 (1987).
"Encyclopedia of Polymer Science and Engineering", vol. 1, Acids, Maleic and Fumaric, pp. 75–76 (1964).

Primary Examiner—Vasu Jagannathan
Assistant Examiner—John J. Guarriello

[57] ABSTRACT

Disclosed are functionalized polyolefins prepared by mixing a polyolefin with a concentrate and extruding the resulting blend, where the concentrate is in the form of olefin polymer particles coated with a mixture of additives including:

A) from 0.05 to 30% by weight, based on the total weight of the concentrate, of one or more nonpolymerizable polar vinyl monomers;

B) from 0.05 to 30% in moles, with respect to (A), of a free radical generating initiator which is not active at temperatures lower than or equal to 70° C., and optionally, C) from 0.1 to 5% by weight, based on the total weight of the concentrate, of a coating substance.

12 Claims, No Drawings

CONCENTRATES SUITABLE FOR THE PREPARATION OF FUNCTIONALIZED POLYOLEFINS AND FUNCTIONALIZATION PROCESS USING SAID CONCENTRATES

The present invention relates to concentrates suitable for the functionalization of homopolymers and copolymers of α-olefins having 2–10 carbon atoms, as well as the functionalization process using said concentrates.

Various processes are known which modify the apolar nature of olefin polymers by introducing polar groups in their macromolecular chains, such as for example carboxyl, hydroxyl, ester or amino groups.

Said processes consist of reacting the olefin polymers, in the presence of radical generators, with organic compounds that besides containing one or more of the above mentioned functional groups, generally comprise at least one double bond. Besides allowing the grafting of the polar compound in various sites along the polyolefin chains, said double bond is also susceptible to polymerization, with the formation of homopolymer chains of the polar compound which are bonded, but also partly not bonded, to the polyolefin. The above grafting reaction brings about the formation of polyolefin chains with functional groups, i.e. the functionalization of the polyolefin.

It has been found that in many applications, such as metal coating, or compatibilization of mixtures between polyolefins and polar polymers, such as polyamides and polyesters, or preparation of glass reinforced polyolefins, where said applications require the use of suitable quantities of the above mentioned functionalized polyolefins, the best performance is given by functionalized polyolefins in which the polar groups are present in many and separate units (made up of single monomers, or oligomeric chains) grafted along the polyolefin chains, instead of a few and long hanging polymer chains.

The most simple and efficient way of preparing functionalized polyolefins free of long hanging polymer chains is to use unsaturated polar compounds such as maleic anhydride (or corresponding acid or esters), which are incapable of forming high molecular weight homopolymers in the presence of free radical generating initiators. Said unsaturated polar compounds are herein referred to as nonpolymerizable polar vinyl monomers.

Various processes are known in the art for the preparation of the above mentioned functionalized polyolefins. Said processes can be summarized as follows: p1 A) grafting in solution: polyolefin, polar monomer and free radical generating initiator are dissolved in solvents (such as xylene, decane, diisobutyl ketone, chlorobenzene) at temperatures usually ranging from 130° to 150° C.;

B) grafting in the solid state: polyolefin, polar monomer and free radical generating initiator are mixed dry at ambient temperature and the mixture is then heated to temperatures usually exceeding 130° C.;

C) grafting in the molten state: polar monomer and free radical generating initiator are added to and mixed with the polyolefin, which is previously heated until completely melted, operating in proper mixers or extruders at temperatures from 180° to 150° C.

Process (A) gives functionalized polyolefins with highly homogeneous distribution of the polar groups, but presents the drawback of having to use and recycle a considerable quantity of solvents. Moreover, the quantity of monomer, maleic anhydride for example, that can be grafted on the polyolefin is low, usually not more than 3% by weight. When the polyolefin is polypropylene, the grafting using this process involves considerable degradation due to the relatively high operating temperature. When the polyolefin is polyethylene, undesired cross-linking occurs, also due to the rather high grafting temperatures.

With process B), the drawback caused by using solvents is eliminated, but the distribution of polar groups in the functionalized polyolefin is less homogeneous. Moreover, process B) is also subject to the above mentioned degradation and/or cross-linking phenomena. With process C), the high temperatures often cause partial volatilization of the polar monomer as well as the above mentioned secondary degradation and/or cross-linking reactions of the olefin polymer.

Now a new process has been found which is suitable for grafting nonpolymerizable polar vinyl monomers, preferably maleic anhydride, to homopolymers and copolymers of α-olefins having 2–10 carbon atoms, said process comprising blending the above homopolymers and copolymers with an adequately prepared concentrate, and extruding the blends thus obtained.

Therefore, the present invention provides concentrates in the form of olefin polymer particles coated at least on the surface, and optionally inside the pores, with a blend of additives comprising:

A) from 0.05 to 30% by weight, preferably from 0.2 to 10% by weight, based on the total weight of the concentrate, of one or more nonpolymerizable polar vinyl monomers;

B) from 0.5 to 30% in moles, preferably from 0.5 to 5% in moles, with respect to (A), of a free radical generating initiator which is not active at temperatures lower than or equal to 70° C., and optionally C) from 0.1 to 5% by weight, based on the total weight of the concentrate, of a coating substance.

The above concentrates are prepared by using a process comprising the following steps:

1) blending at temperatures ranging from 50° to 70° C., preferably higher than or equal to 50° C. and lower than 60° C., an olefin polymer in particle form, one or more non polymerizable polar vinyl monomers and a free radical generating initiator which is not active at temperatures lower than or equal to 70° C., and optionally, 2) adding a coating substance at the same time as, or after step (1).

For the blending of step (1) one can use any solid product mixer, such as for example mixers operating at either low or high rpm. Components (A), (B), and (C) are introduced in the mixer in the proportions indicated above. When high rpm mixers are used (such as turbomixers), the heat produced during the blending operation is generally sufficient to reach 50°–70° C. temperatures.

However, one can operate with properly heated mixers. In order to obtain a better distribution of the nonpolymerizable polar vinyl monomers in the polyolefin, it may also be advantageous to carry out a first phase at ambient temperature (mixing at low rpm for example), and then increase the blending temperature until the values indicated above are reached. When in step (1) maleic anhydride is used as the nonpolymerizable polar vinyl monomer, said maleic anhydride melts and is uniformly distributed on the surface of the olefin polymer particles, and optionally inside the pores of the above particles, and blends homogeneously with the radical initiator.

At the end of the functionalization process, therefore, when the polar monomer is maleic anhydride one obtains optimum results in terms of distribution of the polar monomer and of good performance of the functionalized polyolefin in reference to the applications mentioned above.

It is also possible to use in combination with or as alternatives to the maleic anhydride, other nonpolymerizable polar vinyl monomers which are liquid at ambient temperature or have an external melt point from 50° to 70° C. Therefore, examples of nonpolymerizable polar vinyl monomers that can be used advantageously are unsaturated cyclic anhydrides and their aliphatic diesters, and the diacid derivatives. In particular, besides maleic anhydride, one can use monomers selected from $C_1$–$C_{10}$ linear and branched dialkyl maleates, $C_1$–$C_{10}$ linear and branched dialkyl fumarates, itaconic anhydride, $C_1$–$C_{10}$ linear and branched itaconic acid dialkyl esters, maleic acid, fumaric acid, itaconic acid and mixtures thereof.

As previously stated, at the temperatures reached during stage (1), the radical initiator is not active, i.e. it basically cannot react with the polyolefin polymer to form radicals along the polymer chains. After step (1), or at the same time, one can also add substances whose purpose is to coat the polymer particles, such as for example paraffin waxes, oils, and epoxy resins. It is preferable to add the coating substances after step (1). Said substances provide to the concentrates of the present invention better stability in time, and act as diluent for the polar vinyl monomers during the functionalization step, thus hindering the evaporation of said monomers during the above mentioned step.

Specific examples of said substances are: OIL OB 55 paraffin oil marketed by ROL; W835 petroleum paraffin wax marketed by WITCO CHEMICAL; vaseline oil; EPIKOTE 882 epoxy resin marketed by SHELL Chemical Company.

When the vinyl monomers and the radical generator are not liquid at temperatures lower than or equal to 70° C., the adhesion of said additives to the polyolefin is assured by the coating substances mentioned above. The concentrates thus prepared are then mixed with the polyolefins to be functionalized, preferably operating dry, and using the mixers previously described. The polyolefins to be functionalized, which can be the same or different from the ones used for the concentrates, can be in powder, flake or pellet form. The functionalization occurs by extrusion of the blends obtained. However, the concentrates of the present invention can also be added advantageously while the melted polymers are being processed (i.e., when the final products are being manufactured). In this case, the functionalization step is carried out in situ. One can also extrude the concentrates in their pure state, i.e. without introducing additional polymer during processing, particularly when the quantity of polar vinyl monomers in the concentrates ranges from 0.05 to 5% by weight. In this case one obtains the functionalization of the olefin polymer present in the concentrate.

The functionalization step can be carried out with any known apparatus suitable for the extrusion and mixing of polymer powders or particles in the molten state. The extrusion is done at temperatures preferably ranging from 180° to 250° C.

During the functionalization step the nonpolymerizable polar vinyl monomers, already dispersed in the polymer matrix and therefore not easily evaporable, are grafted along the polyolefin chains as uniformly distributed single monomer units. Since under these conditions the grafting reaction is very efficient, it is possible to limit the quantity of radical initiator to the minimum required for said reaction, thus drastically reducing the secondary degradation, branching and/or cross-linking reactions in the polymer matrix. The grafted product obtained by the process of the present invention displays, besides the optimum adhesive and compatibility properties mentioned above, also improved mechanical performance and an almost nonexistent yellow tint. In particular, according to the present invention, functionalized polyolefin composite materials are obtained, which show optimum adhesive properties to metals and can be reinforced with glass fibres (or other mineral fillers such as talc, calcium carbonate, silica and mica) thus providing articles endowed with good mechanical properties. Moreover, the concentrates and/or the olefin polymers functionalized by means of the concentrates of the present invention are useful to prepare composite materials with polar polymers, such as polyamides, polyesters and polycarbonates, endowed with optimum mechanical properties and impact resistance.

The olefin polymers used for the preparation of the concentrates of the present invention are in the form of subdivided particles, i.e. powders, flakes and spherical or spheroidal particles, preferably having good to excellent surface area (for example 20–300 $m^2/g$) and porosity (for example pore volume ranging from 7 to 50% of the total volume).

Generally speaking, the above olefin polymers are selected from homopolymers and copolymers of olefins of the formula R—CH=$CH_2$, or mixtures thereof, where R is a hydrogen atom, or an alkyl radical with 1–8 carbon atoms, or an aryl radical (particularly phenyl). In particular, said homopolymers and copolymers include:

1) isotactic, or mostly isotactic polypropylene;
2) HDPE, LLDPE and LDPE polyethylene (HDPE and LLDPE are preferred);
3) crystalline copolymers of propylene with ethylene and/or other α-olefins, such as for example 1-butene, 1-hexene, 1-octene, and 4-methyl-1-pentene, containing preferably from 98% to 80% by weight of propylene;
4) ethylene/α-olefin elastomeric copolymers and ethylene/α-olefin-diene terpolymers containing minor proportions of diene, where the α-olefin is preferably selected from propylene, 1-butene, 1-pentene, 1-hexene, 4-methyl-1-pentene, and 3-methyl-1-butene. As the dienes most commonly present in the above mentioned elastomeric copolymers are butadiene, ethylene-norbornene, and 1,4-hexadiene;
5) heterophasic polymers obtained by sequential polymerization, comprising a homopolymer fraction of propylene (A), or one of the copolymers of item (3) above, and a copolymer fraction (B) made up of the elastomeric copolymers of item (4) above.

Said polymers can be obtained by any known process, at high or low pressure, in gas phase, in suspension, or in solution, in the presence of conventional or high-yield Ziegler-Natta catalysts, or catalysts based on chrome compounds supported on silica or alumina, or radical initiators.

The preferred olefin polymers are the ones in spherical form having a pore volume fraction higher than or equal to 7%, particularly higher than or equal to 20%.

The particles with a pore volume fraction higher than or equal to 20% can be obtained by using high-yield Ziegler-Natta catalysts of the type described in Examples 2, 3, and 4 of published European patent application EP-A-0395083.

It is also preferred that more than 40% of the polymer particle pores have a diameter greater than one μm. The dimensions of the single polymer particles can have a wide range, from 0.1 to 10 mm for example.

The polyolefins to be functionalized with the addition of the concentrates of the present invention are preferably selected from the above mentioned homopolymers and copolymers, however, their morphologic characteristics, surface area, and porosity are not particularly critical.

Any free radical generating initiator that is not active at temperatures Lower than or equal to 70° C. can be used for the preparation of the concentrates of the present invention, but the preferred ones are the initiators, particularly peroxides or azo-derivatives, having a semidecomposition temperature ranging from 90° to 240° C. The semidecomposition times range preferably from 1 to 60 minutes. Typical examples of free radical generating initiators that can be used advantageously are benzoyl peroxide, di-tert-isobutyl peroxide, dicumyl peroxide, tert-butyl perbenzoate, 2,5-dimethyl-2,5-bis(tert-butylperoxy)hexane, 2,5-dimethyl-2, 5-bis(tert-butylperoxy)hexyne-3, or azobisisobutyronitrile.

The quantity of concentrate that is added to the polyolefin to be functionalized obviously depends on the quantity of grafted nonpolymerizable polar vinyl monomers desired in the final product. Normally said quantity of nonpolymerizable polar vinyl monomers ranges from 0.03 to 5% by weight based on the total weight of polyolefin plus nonpolymerizable polar vinyl monomers. As an example, the quantity of concentrate to be used in order to obtain the above mentioned level of functionalization varies from 0.1 to 30, preferably from 0.5 to 30% by weight based on the total weight of polyolefin plus concentrate.

Of course, depending on the concentration of grafted nonpolymerizable polar vinyl monomers which one wants to obtain, and the quantity of nonpolymerizable polar vinyl monomers present in the concentrates, it is also possible to use, for some applications, higher quantities of the above mentioned concentrates.

The following examples are given to illustrate and not limit the present invention. Examples 1, 2, 3 and 6 illustrate the preparation of polyolefins functionalized according to the present invention and endowed with optimum adhesive properties to metals (carbon steel). Example 5 relates to a composite reinforced with glass fibres. Examples 7 and 8 illustrate the preparation of a composite material based on polyamide and rendered impact resistant by means of heterophasic propylene/ethylene copolymers functionalized according to the present invention. Comparative Example 4 shows that the adhesive properties to metals are remarkably lower when the olefin polymer is functionalized by a process different from that of the present invention.

EXAMPLE 1

A concentrate of the present invention is prepared using the following materials and mixing procedure:

a) VALTEC 7026/XOS polypropylene homopolymer (available commercially from HIMONT Italia S.r.l.) spheroidal particles, with pore volume equal to 20% of the total volume (determined by way of mercury absorption test), tamped apparent density=0.38 g/cm$^3$, fraction insoluble in xylene=96% by weight, and melt index M.I./L (ASTM D 1238-82)=20 g/10 min;

b) maleic anhydride;

c) Trigonox C tert-butylperbenzoate marketed by AKZO CHEMIE;

d) propylene/ethylene random copolymer with ethylene content=3.4–4.2% by weight, melt temperature (determined by way of DSC)=146° C., melt index M.I./L=9 g/10 min;

e) ethylene/propylene elastomer, completely soluble in xylene at 25° C., with an ethylene content=56% by weight, viscosity Mooney ML 1+4 at 100° C.=40.

Into a GENERAL/MEC GTM 110 Turbomixer (2000 rpm) equipped with immersion probe for the continuous monitoring of the temperature, are introduced, in nitrogen flow, 94 parts by weight VALTEC 7026/XOS of polypropylene homopolymer, 1 part by weight of peroxide, and 5 parts by weight of maleic anhydride, maintaining the content under agitation in nitrogen flow until the temperature, due to agitation, reaches 60° C. Said agitation is then interrupted, and the content is allowed to cool, thus obtaining the maleic anhydride and peroxide concentrate.

A functionalized polyolefin of the present invention is prepared according to the following procedure:

3 parts by weight of the concentrate prepared above is dry mixed (at ambient temperature) with 97 parts by weight of a pellet mixture obtained by extruding 87 parts by weight of propylene/ethylene random copolymer and 10 parts by weight of ethylene/propylene elastomer. The dry blend thus obtained is introduced into a Brabender Data Processor Plasticorder extruder model PLD 651, at 200° C., and pelletized.

The resulting product (Polypropylene Adhesive=PPA) is used to coat a metallic surface in order to protect it from corrosion, using the following materials:

sanded carbon steel plate 12-04 Prododin First-coat liquid bicomponent epoxy primer produced by T.I.B.

heterophasic propylene/ethylene copolymer with an ethylene content=8% by weight, 14% of extractable in xylene at 25° C., and M.I./L=0.8 g/10 min.

The steel plate is heated to 80° C. and coated with about 80 μm of epoxy primer; the plate is then heated to 190°–200° C., and coated with a 400 μm thick PPA film obtained above with a BRABENDER PLD 651 extruder equipped with a flat film-die at 200° C. Then, also at 200° C. and using the same procedure, one applies an about 2000 μm thick heterophasic propylene/ethylene copolymer film. The resulting product is pressed with a roller in order to seal the various layers to each other, and avoid air bubbles.

An adhesion test at 23° C. and at 120° C., according to method DIN 30670 (90° pealing angle) is carried out on the above obtained sample. The following results respectively were obtained: >30 N/mm (the strip did not separate, but it did yield) and 10 N/mm.

EXAMPLE 2

The ingredients and procedures of Example 1 are the same except that the pellet mixture used is obtained by extruding 67 parts by weight of a propylene/ethylene random copolymer, and 30 parts by weight of ethylene-propylene elastomer.

The adhesion test at 23° C. and 120° C. produced the following results, respectively: >25 N/mm and 9 N/mm.

EXAMPLE 3

The ingredients and procedures of Example 1 are the same except that the peroxide used is Trigonox 101-50 Dpd 2,5-dimethyl-2,5-bis(tert-butylperoxy)hexane, and instead of the ethylene/propylene elastomer a heterophasic ethylene/propylene copolymer containing 23% by weight of ethylene, and 25% by weight of extractable in xylene at 25° C., and having a M.I./L=10 g/10 min. is used. Moreover, the pellet mixture used in this test (97% by weight) was obtained by extruding 48.5 parts by weight of the same random copolymer as Example 1, and 48.5 parts by weight of the above mentioned heterophasic copolymer.

The adhesion test results at 23° C. and 120° C. are respectively: >30 N/mm (the strip yielded) and 8 N/mm.

EXAMPLE 4 (COMPARISON)

The ingredients and procedures of Example 1 are the same except that the blending of the ingredients in the turbomixer is done without exceeding 25° C. The adhesion test at 23° C. and 120° C. produced very low values, i.e., lower than 1 N/mm.

EXAMPLE 5

0.5 parts by weight of concentrate of the same ingredients of Example 1, except obtained in a fast-speed mixer at 60° C., are mixed with 30 parts by weight of CP 713 glass fibers and 69.5 parts by weight of polypropylene homopolymer having an isotactic index of 96.5% and M.I./L=11 g/10 min. The mixture is then extruded at 250° C. in a single screw Bandera 19 extruder. The product obtained was analyzed for the following physical and mechanical properties: tensile strength at break (ASTM D 638)=70.7 MPa, HDT at 1820 KPa (ASTM D 648)=146° C., notched IZOD impact at –20° C. (ASTM D 256)=74.4 J/m, flexural creep (ASTM D 2990)=1.8% (distance between supports 4 cm, at 120° C. for 8 hours with a pressure of 100 Kg/cm$^2$).

EXAMPLE 6

A concentrate prepared according to the procedure of Example 1, except that 92 parts by weight of VALTEC 7026/XOS, 5 parts by weight of maleic anhydride, and 2 parts by weight of Trigonox 101-50 Dpd are used. When the temperature reaches 60° C., 1 part by weight of W 835 paraffin wax is added and blending is continued for some minutes, then the mixing is interrupted and the mixture allowed to cool. 3.6 parts by weight of the concentrate thus prepared are mixed directly in the extruder with 96.4 parts by weight of Rigidex HD 6070 HDPE produced by BP having a MIE=3.6 g/10 min (ASTM D 1238) in a twin-screw Berstorff extruder equipped with two feed-throats. In the first feed throat, located at the beginning of the screw, HDPE is fed and in the second feed throat located at a distance of about 15 screw diameters, the concentrate is introduced and comes directly in contact with the melted polyethylene. The velocity of the screw is 250 rpm, and the temperature of the molten polymer is 240° C. Obtained is an adhesive polyethylene in pellet form. Said adhesive polyethylene is used to coat a metallic surface in order to protect it from corrosion, using the following materials:

sanded carbon steel plate;

OLE' bicomponent liquid epoxy primer produced by Veneziani;

adhesive polyethylene;

HDPE NCPE 6060 polyethylene produced by Neste, having a MIE=0.3 g/10 min.

The steel plate is heated to 70°–80° C. and coated with about 40 µm of epoxy primer. The plate is then heated to 200° C. and coated with a 300 µm thick film of adhesive polyethylene obtained above. The plate coated with the adhesive is heated to about 225° C., and three layers of a melted strip of HDPE NCPE 6060, 800 µm thick and obtained at 250° C. with the same extruder, are then deposited on said plate. The coated steel plate is compressed by using a roller in order to seal the various layers and avoid air bubbles.

An adhesion test is carried out on the sample thus obtained at 23° C. and 100° C. using the procedures described above, and obtaining the following results: 23 N/mm and 6 N/mm respectively.

EXAMPLE 7

A concentrate containing 94 parts by weight heterophasic propylene/ethylene copolymer (ethylene content: 22% by weight, melt index M.I./L=0.7 g/10 min), 5 parts by weight maleic anhydride and 1 part by weight 2,5-dimethyl-2,5-bis (t-butylperoxy)hexane is prepared according to the procedure in Example 1. Thereafter, 6 parts by weight of said concentrate and 24 parts by weight of the above mentioned heterophasic copolymer are introduced into the first hopper located at the initial part of a BUSS-70 extruder, while 70 parts by weight of PA 6 RADILON 6 polyamide marketed by Radici having a breaking strength=47 MPa, RCI Izod resilience at 0° C.=45 J/m are introduced into the second hopper located in the middle of the extruder. The temperature of the extruder is 200° C. between the first and the second hopper and 250° C. between the second hopper and the exit.

Obtained is a composite material having breaking strength=42 MPa and RCI Izod at 0° C.=280 J/m.

EXAMPLE 8

6 parts by weight of the concentrate obtained in Example 7, 24 parts by weight of heterophasic propylene/ethylene copolymer (ethylene content: 22% by weight, melt index M.I./L=0.7 g/10 min) and 70 parts by weight of PA 6 RADILON 6 polyamide are introduced into the first hopper of the extruder used in Example 7, where they are mixed and extruded at 250° C. Obtained is a composite material having breaking strength=43 MPa and RCI Izod resilience at 0° C.=320 J/m.

Other features, advantages and embodiments of the invention disclosed herein will be readily apparent to those exercising ordinary skill after reading the foregoing disclosures. In this regards, while specific embodiments of the invention have been described in considerable detail, variations and modifications of these embodiments can be effected without departing from the spirit and scope of the invention as described and claimed.

We claim:

1. A concentrate consisting essentially of olefin polymer particles made by a process of coating at temperatures lower than or equal to 70° C., at least on the surface, and optionally inside pores of said particles, with a mixture of additives:

A) from 0.05 to 30% by weight, based on the total weight of the concentrate, of at least one non-homopolymerizable polar vinyl monomer;

B) from 0.05 to 30% in moles, with respect to (A), of a free radical generating initiator which is not active at temperatures lower than or equal to 70° C., and optionally C) from 0.1 to 5% by weight, based on the total weight of the concentrate, of a coating substance, wherein said non-homopolymerizable polar vinyl monomer is at least one member selected from the group consisting of maleic anhydride, linear and branched dialkyl maleates, linear and branched dialkyl fumarates, itaconic anhydride, linear and branched dialkyl itaconates, maleic acid, fumaric acid, and itaconic acid.

2. The concentrate of claim 1, wherein the olefin polymer is selected from the group consisting of homopolymers or copolymers of olefins of formula R—CH=CH$_2$, or mixtures thereof, where R is a hydrogen atom, or an alkyl radical with 1–8 carbon atoms, or an aryl radical, in the form of spherical particles having a fraction of pore volume higher than or equal to 7%.

3. The concentrate of claim 2, wherein the olefin polymer is selected from the group consisting of isotactic, or mainly isotactic polypropylene, crystalline copolymers of propylene with ethylene and/or other α-olefins, containing from 98% to 80% by weight of propylene, HDPE, LLDPE or LDPE polyethylene.

4. The concentrate of claim 1, wherein said polar vinyl monomer is maleic anhydride.

5. The concentrate of claim 1, wherein the radical initiator has a semidecomposition temperature ranging from 90° to 240° C. and a semidecomposition time of 1 to 60 minutes.

6. The concentrate of claim 1, wherein the free radical generating initiator is selected from peroxides and azo derivatives.

7. The concentrate of claim 1, wherein the free radical generating initiator is selected from the group consisting of benzoyl peroxide, di-tert-butyl peroxide, dicumyl peroxide, tert-butyl perbenzoate, 2,5-dimethyl-2,5-bis(tert-butylperoxy)hexane, 2,5-dimethyl-2,5-bis(tert-butylperoxy) 3-hexyne, and azobisisobutyronitrile.

8. The concentrate of claim 1, wherein the coating substance is selected from the group consisting of paraffin waxes, oils and epoxy resins.

9. A process for the preparation of the concentrate of claim 1, comprising the following steps:

1) blending, at temperatures from 50° to 70° C., an olefin polymer in particle form, at least one said polar vinyl monomer and a free radical generating initiator which is not active at temperatures lower than or equal to 70° C., such that said initiator does not react with said olefin polymer, and optionally, 2) adding a coating substance during or after step (1).

10. A process for grafting polar functional groups as single monomer units onto a polymer of an α-olefin having 2–10 carbon atoms, comprising mixing said polymer with a concentrate of claim 1, and extruding the blend thus obtained, wherein said blend is extruded at a temperature of 180° to 250° C.

11. The process of claim 10, wherein the concentrate is added to said polymer in an amount of from 0.1 to 30% by weight based on the total weight of polymer plus concentrate.

12. The process of claim 9, wherein the blending of step 1) is performed at temperatures greater than or equal to 50° C. and less than 60° C.

* * * * *